A. B. KNIGHT.
GLASS ETCHING MACHINE.
APPLICATION FILED APR. 25, 1908.
912,386.
Patented Feb. 16, 1909.
5 SHEETS—SHEET 1.
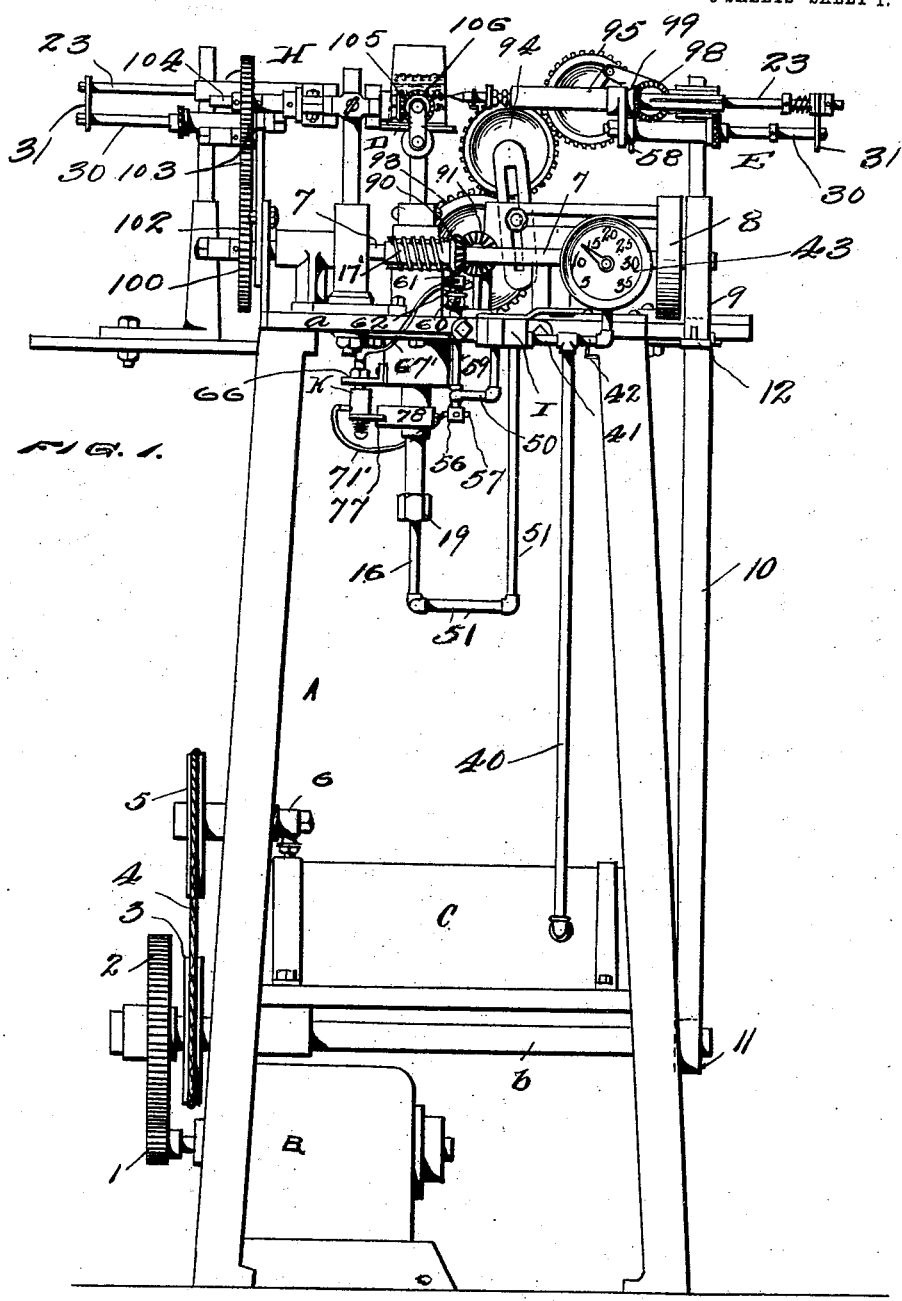
WITNESSES
INVENTOR A. B. KNIGHT.
GLASS ETCHING MACHINE.
APPLICATION FILED APR. 25, 1908.
912,386.
Patented Feb. 16, 1909.
5 SHEETS—SHEET 2.
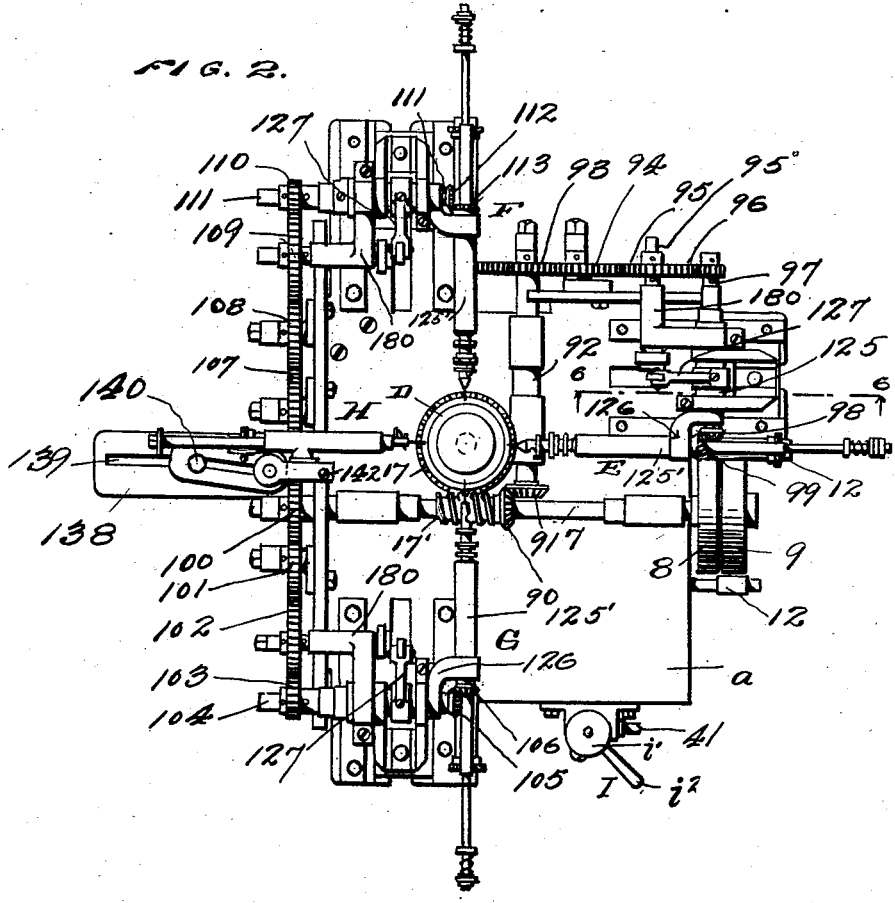
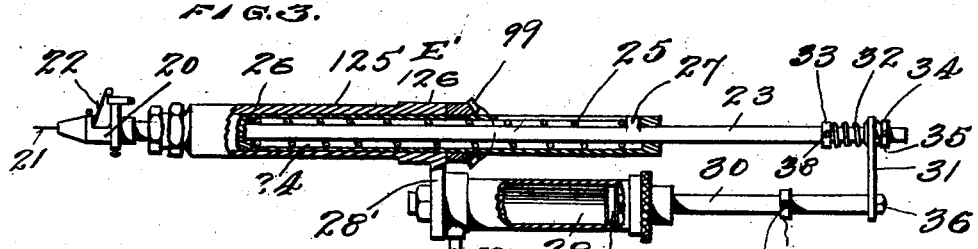
WITNESSES
Chas N. Davies.
Myron G. Cleas.
INVENTOR
A. B. Knight,
By C. L. Parkes
Attorney

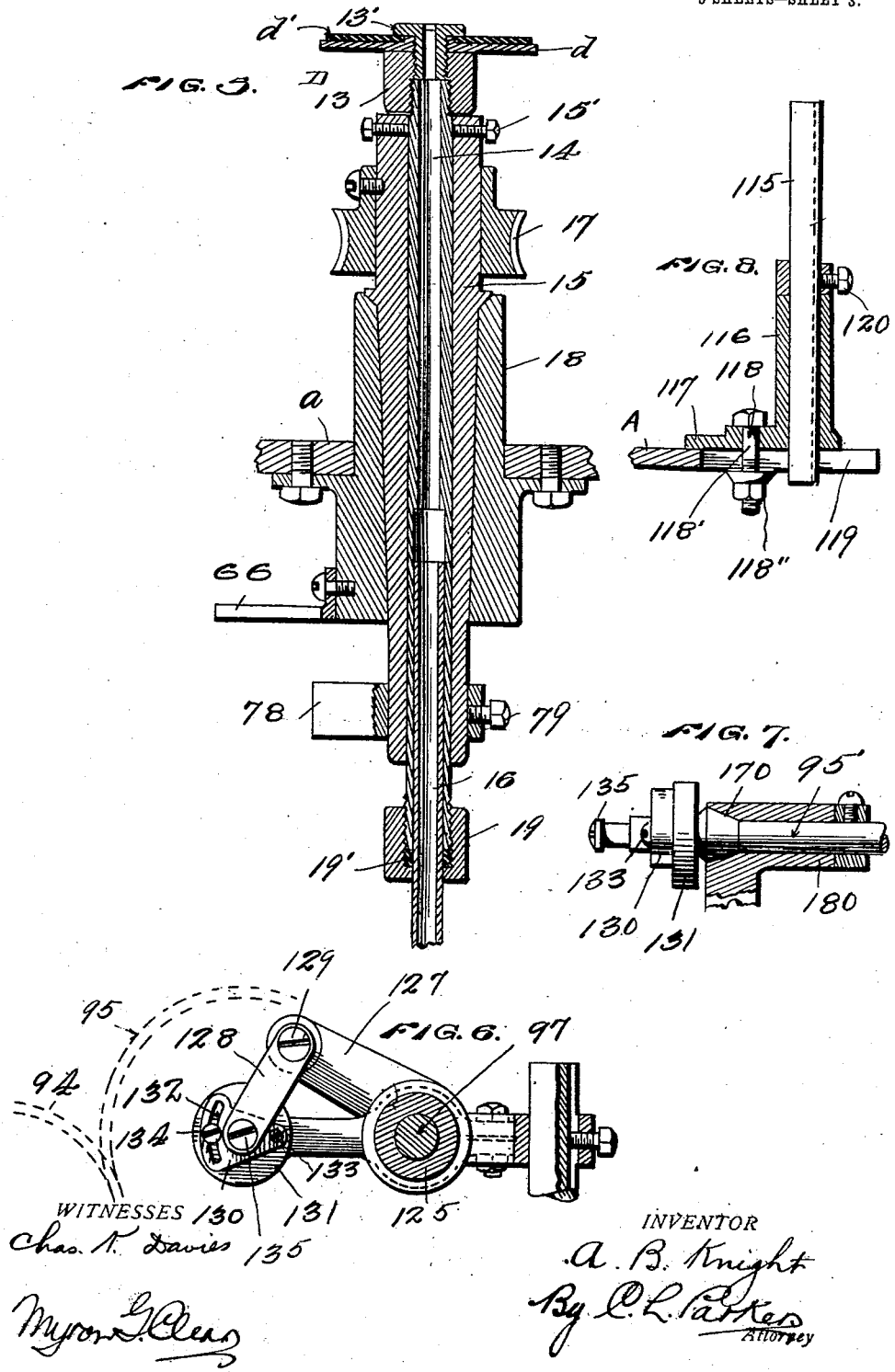

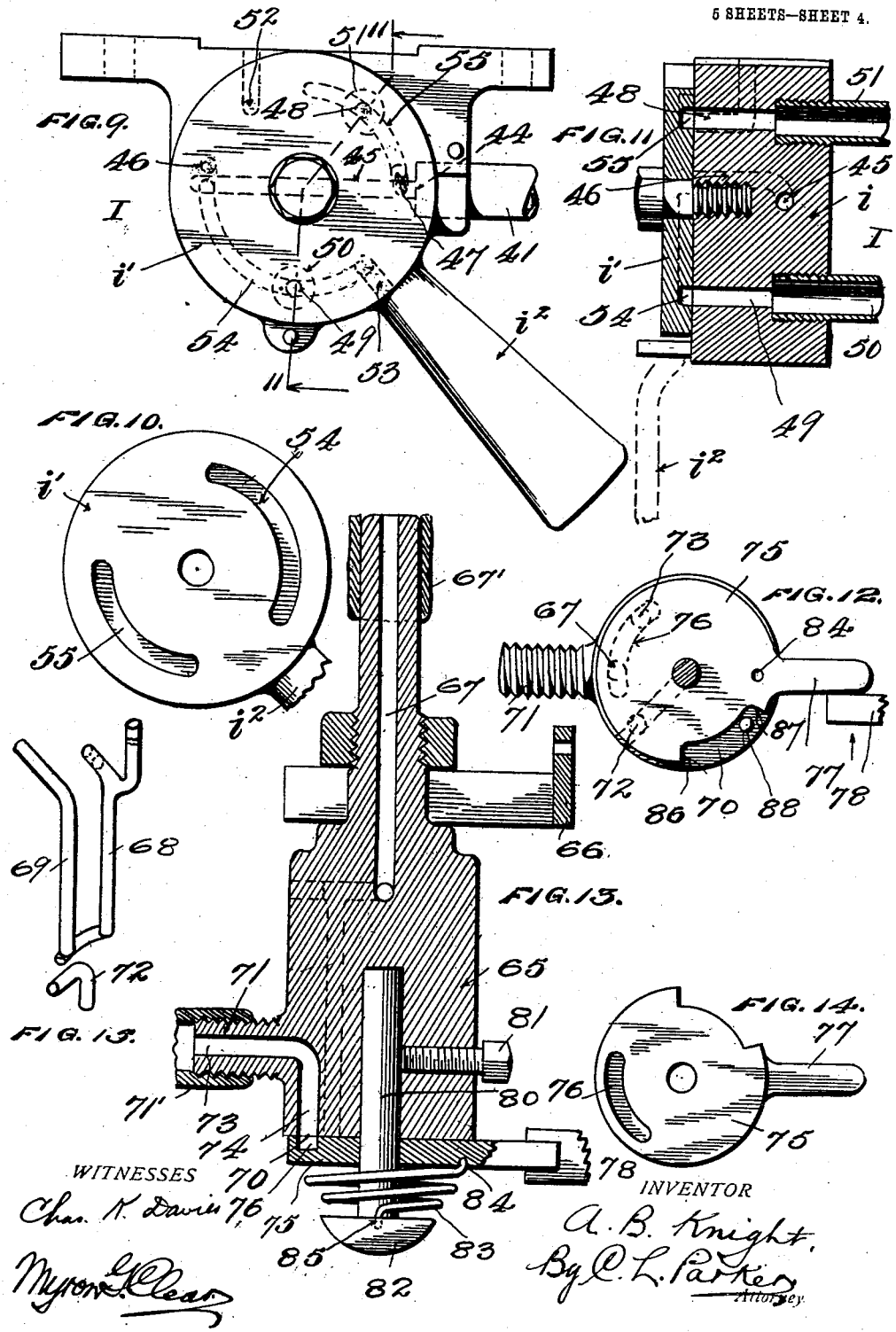

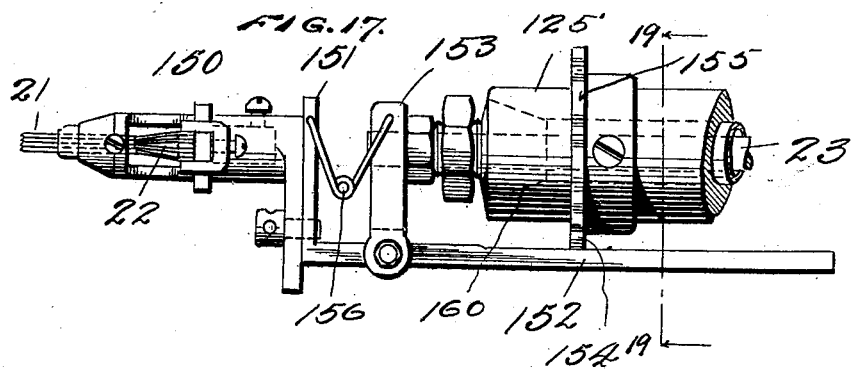
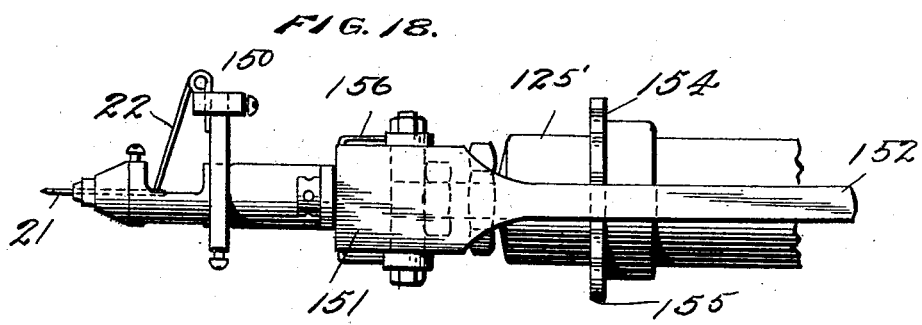
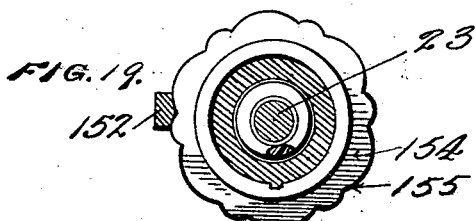
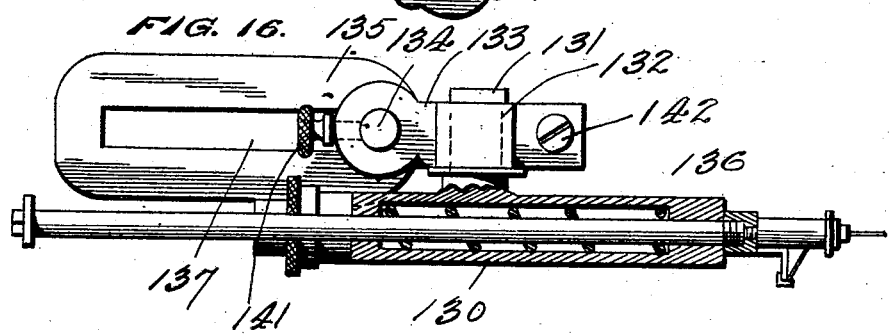

UNITED STATES PATENT OFFICE.

ALBERT B. KNIGHT, OF FAIRMONT, WEST VIRGINIA.

GLASS-ETCHING MACHINE.

No. 912,386.  Specification of Letters Patent.  Patented Feb. 16, 1909.

Application filed April 25, 1908. Serial No. 429,275.

*To all whom it may concern:*

Be it known that I, ALBERT B. KNIGHT, citizen of the United States, residing at Fairmont, in the county of Marion and State of West Virginia, have invented certain new and useful Improvements in Glass-Etching Machines, of which the following is a specification.

This invention relates to engraving machines and particularly to the type thereof which are employed in etching, for incising the wax or other protective substance with which a glass tumbler or other article to be etched, is coated.

The object of the invention is to provide an engraving machine with several new and useful features whereby its durability and effectiveness are enhanced and results may be accomplished which are peculiar to the present invention and are important in their effect, and by means of which I am enabled to produce a far greater output of etched ware than has heretofore been attained. In pursuance of this object, I have provided a machine in which, among others of its novel features, the movement of the etching points or needles toward and from the substance to be incised thereby is air-controlled and said points or needles have connection with peculiar means whereby they are rotated and are given motion in the plane of the etching ground. What I regard as the most practical embodiment of that feature of my invention which relates to the reciprocation of the etching needles toward and from the etching ground, the needles are moved toward said ground by creating a vacuum on one side of a piston which is connected with the carrier of the needles and in said movement a spring having suitable connection with said carrier is placed under tension which causes it to move the carrier and piston (with the needles) away from the etching ground when said vacuum is sufficiently relieved.

The means by which the etching points or needles are moved in the plane of the etching ground are of peculiar construction and, among others of its novel features, it contains provision for varying the extent of its movement.

The article to be etched is held to its support by suction and said support is adjustable so as to adapt the apparatus to articles of different kinds, as tumblers and pitchers, for example, as well as to provide for variation in the position of the incised lines with respect to the height of different articles.

Another of the features peculiar to the present invention resides in the fact that the suctional force by which the article to be etched is held upon its support and the suctional force by which the etching needles or points are moved toward or from said article, are controlled by a common regulating device which is so constructed and related to the suction, producing means and the etching needles and said support, that these suctional forces will be successively introduced.

Still another novel feature of my invention consists of means whereby the needles are automatically retracted from such articles as punch or sherbet glasses, etc., provided with handles, at a time and to an extent sufficient to clear the handles thereof.

These and other features peculiar to the present invention are embodied in the construction illustrated in the accompanying drawings, but it is to be understood that the invention is not restricted to the details illustrated, and that the drawings and the language employed in my description of the invention are to be interpreted as illustrative of what I consider to be the best embodiment of the invention, and that many changes in the illustrated embodiment and many apparently widely different means may be employed without departing from the spirit of the invention or the scope of the subjoined claims.

In said drawings:—Figure 1 is a side elevation of a machine embodying my improvements. Fig. 2 is a top plan view thereof. Fig. 3 is a detail representation of the engraving means, showing the same partly in plan and partly in horizontal section. Fig. 4 is a sectional detail view of part of the needle-carrier. Fig. 5 is a detail sectional view of the tumbler support, more especially showing the means whereby the height of the same may be varied. Fig. 6 is a section on the line 6—6 of Fig. 2, particularly intended to show in detail the means which moves the needle-carrier in the plane of the etching ground and permits variation of the throw thereof. Fig. 7 is a detail representation of a means for taking up wear in the needle carrier. Fig. 8 is a detail representation of a shaft carrying one of the interchangeable gears which controls rotation of the needle carrier, and parts associated with the shaft whereby it is adjustable to accord with different gears, to adjust said carrier to different parts of a design according to its location upon the ware as well as different sizes of ware. Fig. 9 is a plan view of the suction-regulating valve. Fig. 10 is an inverted plan of the top plate thereof. Fig. 11 is a vertical section through said valve on the plane of the line 11—11 of Fig. 9. Fig. 12 is a plan view of the valvular means by which the needles are automatically retracted to clear protruding means, such as handles, upon articles being etched. Fig. 13 is a vertical section through the latter means. Fig. 14 is an inverted plan view of the channeled plate of said valvular means. Fig. 15 is a detail representation of the channels in the plug of said valvular means. Fig. 16 is a detail representation, partly in plan and partly in section, of the carrier, shown at the left in Fig. 2, for the needle which produced the incised lines for borders. Fig. 17 is a side elevation of a form of needle-carrying means adapted to produce wavy lines. Fig. 18 is a plan view of the same, and Fig. 19 is a cross section on the line 19—19 of Fig. 17.

The same characters of reference designate the same parts in the several figures.

A designates a frame of any suitable construction preferably having a bed $a$ upon and above which the engraving means are mounted.

B designates a driving motor, preferably electric, which is geared with and drives a shaft $b$, and C designates a vacuum tank exhausted by a suitable pneumatic pump which is driven from said shaft. The gearing here shown between the several parts mentioned comprises a pinion 1, mounted on the shaft of the motor and intermeshed with a gear 2, mounted on the shaft $b$, which shaft is also provided with a pulley 3 connected by a belt 4 with a second pulley 5 mounted on a shaft 6, which drives the pump for creating a vacuum within tank C.

Mounted above the bed $a$, is a shaft 7 from which the several engraving devices and the support for the article being engraved derive motion through intermediate connections hereinafter set forth. This shaft 7, is provided with a fast pulley 8, and a loose pulley 9; either of which may be connected with the shaft $b$ by means of a belt 10, running over a suitable pulley 11, on said shaft $b$. Any suitable belt-shifting device may be employed for moving the belt from one pulley 8 or 9, to the other. The position of this belt-shifting device is indicated at 12.

The support for the article to be engraved is designated by the letter D, and the engraving devices, of which four are herein illustrated, are arranged radially around said support and are designated by the letters E, F, G, and H. The illustrated support D is hollow and comprises a table $d$, the upper surface of which is provided with a packing $d'$. The table and packing are clamped between hollow nuts 13 and 13′, the latter extending through the table and having a threaded engagement with the nut 13. A tube 14 extends from the nut 13, through a sleeve 15. This tube is herein shown as mounted upon the upper end of a tube 16, which projects into it to an extent which permits the latter to be moved thereupon, in order to raise or lower the table $d$, without disengaging them from each other. The tube 14 is held in its adjusted position by screws 15′ or other suitable means.

A gear 17 is mounted on the tube 14 and is in mesh with a worm 17′ on the shaft 7, whereby the table is rotated. The tube 15 has its bearing on a sleeve 18 which is preferably fixed to the table $a$, and the inner tube 14 has its lower end engaged by a collar 19 provided interiorly with packing 19′. The upper end of the tube 16 extends through said collar and into the tube 14, and its lower end is connected with a pipe 50 leading from the regulator I, as hereinafter more fully explained.

Each engraving device herein illustrated comprises a needle carrier E′, provided with a head 20 adapted to hold one or more needles or incising points 21. These points 21 are removably mounted in the head and are pressed outward therefrom by springs 22, preferably passing through eyes in the incising points. The head is carried by a rod 23, which extends through and is movable longitudinally within a suitable sleeve, 24. The rod is pressed in one direction by a spring 25, which is mounted in said sleeve and has its abutments formed by a wall 26 of the latter and a projection 27 from the rod. The movement of the rod in the other direction is produced pneumatically, and for this purpose a cylinder 28 is mounted in a suitable position, being here shown as fixedly attached to a projection 28′ from the needle carrier. This chamber contains a piston 29, the rod 30 of which is connected with the rod 23, whereby reciprocatory movement of either the needle-carrier or the piston is transmitted from one to the other. The connection here shown is an arm 31.

In the illustrated embodiment of the invention, the piston head is subjected to a suctional force which moves it, and, through the described connection, advances the needle-carrier to its working position. This suctional force is obviously produced by creating a vacuum in the cylinder 28, the means I for regulating which vacuum will hereinafter be set forth. The rod 23, in its advancing movement places the spring 25 under tension sufficient to restore said rod and the piston to their retracted positions when the vacuum in the cylinder 28 is relieved.

In order that the advancing movements of the needles may be concluded without shock sufficient to shatter the article to be etched, a cushion is arranged on the needle-carrier. The cushion here shown is composed of a spring 32 arranged on the rod 23, between a fixed collar 33 and a holding device 34 for one end of the connecting arm, 31. The holding device 34 is loosely mounted on the rod 23 and its movement under the influence of the spring 32 is determined by a fixed stop, 35. The other end of the arm 31, is here shown as mounted on the piston rod 30, against a stop, 36. A stop 37 is also mounted on the piston rod to limit its movement in the cylinder 28. The collars 33, holding device 34, and stops 35 and 37 are preferably adjustably mounted, and are here indicated as provided with fastening screws 38 for securing them in adjusted position on their respective rods.

It has already been stated that the article to be engraved is held to its support by suction. The means for producing and regulating this suction and that within the several cylinders 28, will now be set forth.

40 designates a pipe which leads from the suction tank C through a branch 41 to a regulator I, common to all the parts in which suctional force is to be produced. Through another branch 42, the pipe 40 communicates with an indicator 43. The regulator I comprises a main body $i$, having suitable ports and passages, and a cover $i'$, rotatively mounted on the main body and provided with a handle $i^2$, by which it may be turned, and with suitable passages which control communication of the ports of the main body with each other and with the several cylinders 28, and the article being engraved.

The illustrated arrangement of the ports and passages is as follows: In the side of the main body is a port 44, threaded for connection with the pipe 41. From this port 44, a passage 45 leads across the body, between and offset at its ends into communication with ports 46 and 47 in the face of said body as shown in Fig. 11. Extending entirely through the main body are passages 48 and 49, which are connected with pipes 51 and 50 respectively, to be hereinafter described. Ports and passages 52 and 53, leading to the atmosphere are provided between the port 46 and passage 48 and between the port 47 and passage 49 respectively. The cover $i'$, is provided with channels 54 and 55 arranged on opposite sides of its axis and concentric therewith. The pipe 51 is connected to the tube 16 extending into the tube 14 of the article support D. The pipe 50 leads to a coupling 56 having nipples 57 which by suitable pipes or tubes (one of which is shown broken off at 58, Fig. 3), are severally connected with the cylinders 28 of some or all of the engraving devices. It will be apparent that when the cover plate $i'$ is turned by the handle $i^2$, to throw the port 46 in communication with the passage 49, and the port 47 in communication with the passage 48, through the channels 54 and 55, respectively, the several cylinders 28 and the interior of the tumbler or other article on the table $d$ will be subjected to suction; and similarly that when the cover plate is properly turned to destroy this communication, its channels 54 and 55 will be in communication with the air inlets 52 and 53 and with the passages 48 and 49, thus opening communication of said cylinders and the interior of the article to be etched with the atmosphere, thereby relieving the vacuum in said chambers and article.

Attention is called to the fact that the channels 54 and 55 are so related to the ports and passages which they respectively control, that communication of one channel with one passage is in advance of communication of the other channel with the other passage.

In the position shown in Fig. 9, the valve is midway of its limits of movement, and port 48 is thrown into communication with passage 47, by channel 55, thus establishing communication between the vacuum chamber and the tumbler stand, while port 49 is thrown into communication with air passage 53, by channel 54 thus releasing the vacuum in the piston chambers 28. Thus upon the vacuum release movement the piston chamber vacuum is first broken, while upon continued movement (to the right in Fig. 9), the channel 55 will establish communication between port 48 and air passage 52, thus breaking the tumbler holding vacuum. In like manner upon the movement of handle $i^2$ to establish vacuum, the tumbler holding vacuum is first formed, by the communication of channel 55, between port 48 and passage 47, before channel 54 reaches passage 46, while upon continued movement, the piston chamber vacuum is formed by the communication of channel 54 between port 49 and passage 46.

It sometimes is desired temporarily to use less than the entire number of engraving devices, and in the illustrated embodiment of my invention this may conveniently be done by removing the tube 58 leading to the vacuum chamber of the engraving device which is not to be used, and inserting plugs in the nipples from which such tube has been removed. It is obvious, however, that other means for the purpose may be employed and it is entirely within the purview of the invention to employ any suitable means for establishing and cutting off communication between the coupling 56 and chambers 28.

As thus far described, it will be seen that the engraving devices are capable of producing different effects due to the fact that their reciprocation is under the control of an attendant who may vary the effects by varying the times of the reciprocations, so as to produce a continuous or a discontinuous design as desired, and to the further fact that some of the engraving devices may be cut out of operation. To further widen the range of effects which may be produced, provision is made whereby some one or more of the engraving devices may be controlled independently of any other. This is accomplished in the illustrated embodiment of the invention, by providing the coupling 56 with an extension 59 having a manually operable valve 60 of any suitable construction, and also provided with a coupling 61 having nipples 62. It is apparent that by disconnecting one or more of the cylinders 28 from the coupling 56, in the manner already described, and connecting it with the coupling 61, the engraving device or devices connected with the coupling 61 may be moved to and from the work, at a time different from these to and fro movements of the engraving device or devices which remain connected with the coupling 56.

A further feature of my invention consists in the provision of means whereby the engraving devices may be retracted from their working position automatically in order to be clear of projections, such as handles for example, with which some types of articles are provided. This is accomplished, according to the illustrated embodiment of the invention, by connecting the cylinders 28 severally with valvular means operated at predetermined times in the movement of the article so as to throw said chambers into communication with the atmosphere. It is preferred to provide one of these valvular means for each engraving device. One of the same is indicated at K in Fig. 1. Its details are illustrated in Figs. 12, 13, 14, and 15. It comprises a plug 65, which is suitably supported, preferably from the sleeve 18 of the work-support D. A hanger or bracket 66 secured to said sleeve and from which the plug is suspended is here shown as the supporting means. This plug has a passage 67, which has connection with the cylinder 28, by a hose or other suitable device 67', and is in communication with lateral branches 68 and 69, which lead from the inner end of the passage 67 to and through the face 70 of the plug. The plug also has a nipple 71 which extends from its side and is adapted for connection with a hose 71', preferably employed as a means through which the plug 65 has communication with the coupling 56. The aperture 73 of the nipple 71 opens into a passage 74 extending through the face 70 of the plug 65. The plug is also provided with a passage 72 through which the cylinder 28 may have communication with the atmosphere. A valve or plate 75 is pivotally mounted on the face 70 of the plug and has its inner face formed with a channel 76 which is adapted to establish communication of the passage 67 with either the passage 74 communicating with the cylinder 28, or the passage 72 communicating with the atmosphere. This valve is provided with a projection 77 arranged in the path of movement of a cam 78, which is mounted upon some appropriate part of the apparatus which turns with the work support D. As here shown, the cam is mounted directly upon the tube 15 of the work-support. It is adjustable on said tube so that it may be turned to correspond with the position of the handle of the work, in order to strike the projection 77 at the moment when it is required that the engraving device be retracted from the path of said handle; and it is fixed in its adjusted position by the screw 79 (Fig. 5), for example.

It will be understood that the valve or plate 75, normally maintains communication between passages 67 and 74, but that when a handle of the article being operated on approaches the position predetermined for the engraving device to be retracted, the cam 78 strikes the projection 77 and turns the valve 75 and establishes communication of the chamber 28 of said engraving device with the atmosphere, as already indicated, relieving the vacuum in said chamber and permitting the carrier of the incising point of said engraving device to be retracted by the means already described. It will also be seen that the cam operates successively on the several valvular means so as similarly to cause successive retraction of the several carriers. The valve or plate 75 is here shown as loosely mounted upon a stem 80, which projects into the plug 65 and is secured removably to the latter by a screw 81. This stem is provided with a head 82 and between the stem and valve or plate is a spiral spring 83, which restores the valve to the position from which it has been moved by the cam 78, said spring being placed under tension in the latter movement of the valve. This spring is here shown as having its ends inserted in recesses 84 and 85 formed in the valve 75 and head 82 respectively. The valve or plate is also shown as provided with a cutaway portion, forming shoulders 86 and 87 which coöperate with a pin 88 projecting from the plug 65 to limit the movements of the valve or plate in either direction.

In addition to having the described advancing and retractive movements, some of the needle carriers are rotated and have oscillatory movement in approximately the plane of the etching ground. These rotatory and oscillatory movements are produced from the shaft 7. As here shown, this shaft is provided with a fixed bevel gear 90, which is in mesh with a second bevel-gear 91, mounted fixedly on a shaft 92 having a gear 93 at its opposite end. This gear 93 is shown as meshed with a loose gear 94, which is meshed with a fixed gear 95 and this in turn is meshed with a gear 96 fixed on one end of a shaft 97, the other end of which carries a bevel gear 98 intermeshed with a similar gear 99, mounted on rod 23 of the engraving device E, so as to impart rotatory movement to the needle carrier E', of said device. The shaft 7 is also provided with a large gear 100, which drives two separate trains of gears transmitting rotatory movement to the engraving devices F and G respectively. One of these trains of gears here shown, consists of a loose gear 101 meshed with a loose gear 102, which is in turn meshed with a pinion 103, fixed on the end of a shaft 104, the other end of which has a bevel gear 105 intermeshed with a similar bevel gear 106, secured to an appropriate part of the engraving device G, it being understood that different transmission speeds are obtained, in the practical operation of the device, as in changeable speed lathes, by the employment of different sizes and styles of gear wheels, which, if shown in the accompanying drawings, would obscure the same rather than illustrate the idea, which is well known in the art.

The other of the trains of gears consists of gears 107, 108, 109, and 110; the last named fixed on a shaft 111 having a bevel gear 112 which meshes with a similar gear 113, fixed on an appropriate part of the engraving device F. These engraving devices E, F, and G, are intended to produce in the etching ground, the incisions for what may be termed the body of the design, as contradistinguished from the border thereof, which is produced by the engraving device H.

It is desirable to provide for changes in the train of gears in order to thereby further widen the range of designs which the machine may produce. For this reason, some of the gears are removable so as to permit interchangeability of gears and provision is made for adjustments of shafts. This is illustrated in Figs. 2 and 8 in connection with the gears 94, 101, 107, and 108. Each shaft of these gears is designated 115 and upon reference to Fig. 8 it will be seen that it is a stub-shaft, supported in a sleeve 116, having a foot piece 117 which bears against the side of the frame A and has a clamping device 118, the stem 118' of which is adapted to traverse a longitudinal slot 119 in said frame, whereby the position of the shaft with reference to the next shaft may be adjusted. The shaft 115 is also adjustably and removably mounted in its sleeve or bearing 116, and is fixed therein by the screw 120. Similarly, the sleeve or bearing 116 may be removed by reason of the illustrated separability of the elements 118' and 118'' of its clamping device.

The engraving devices E, F, and G, in addition to their described rotatory and reciprocatory movements have imparted to them oscillatory movement in approximately the plane of the etching ground. This oscillatory movement is effectively produced without interfering with the said rotary movement, by means which will now be described. Each of said engraving devices E—G is provided with a support composed of three members. Two of these members are tubular and are arranged approximately at right angles with each other. The third member is of crank-form and connects together the adjacent ends of said tubular members. These holders are or may be of like construction so that a description of one will answer for all. One will be described in connection with the engraving device E, and it will be understood that the others are connected with and operate similarly upon and from the corresponding parts of their respective engraving devices. One of its tubular members is designated 125 and encircles the shaft (97), which carries the bevel gear 98 which transmits movement to the carrier E' of the incising point of needle. The other tubular member 125', encircles said carrier. The third member is designated 126. From the end of the member 125 remote from the member 126, a crank arm 127 extends and is connected with a link 128, one end of which is pivoted at 129 to the crank arm 127, and the other end of which has connection with the shaft 95', carrying the gear 95, which forms part of the train for transmitting movement to the shaft 97 referred to. The connection here shown is through a segmental plate 130, which is adjustably secured to a head 131, with which the shaft 95' is provided. This plate has at one end an elongated slot 132 and at its other end, it is provided with a screw 133 which may be slackened to permit the plate to be turned pivotally thereon, while a screw 134 in the elongated slot 132 coöperates with the screw 133 in securing the plate in adjusted position. The link 128 is pivoted to this plate at 135. It will be apparent that the relation of the pivot or crank pin 135 with respect to the axis of the shaft 95' may be varied by adjusting the segmental plate 130 and in consequence of this, the extent of the oscillatory movement which is imparted to the needle carrier E' through the means described, is correspondingly variable, thus further enhancing the capability of the machine to produce various designs in the etching ground.

The engraving device H is intended, as already stated, for the border, and rotative movement need not be imparted to it. It is, as here shown, however, provided with means whereby it may be adjusted variously to adapt it to different sizes and kinds of articles, as pitchers, tumblers, etc., and to vary the position of the border thereon. The particular means illustrated for the purpose are as follows: Its casing is provided as shown best in Fig. 16, with a trunnion 131, which is borne by a seat 132 therefor carried by a support 133, which is pivoted at 134 to a base plate 135. By this means, the carrier 136 of the engraving device may be adjusted up or down, around the trunnion 131 as an axis, and laterally upon or around the pivot 134. In addition to these adjustments, it may be set nearer to or farther from the support D, by reason of the fact that the base-plate 135 is also adjustably mounted on the frame of the structure. Thus, as here shown, this base plate is formed with a longitudinal aperture 137 and the platform a (see Fig. 2), is provided with an extension 138 having a longitudinal aperture 139 which at some point in its length is always registered with some part of the longitudinal aperture 137, and through these registering places a suitable clamping device, indicated at 140, extends to hold the parts fixedly in adjusted position. The parts are held in fixed position after adjustment around the pivot 134, by a screw 141 which engages said pivot. A screw 142, or other suitable means, may be employed to fix the inner end of the support 133 to an appropriate part of the frame, or other fixed part of the apparatus, after adjustment of the support. In order to further widen the range of designs which the machine is capable of producing, means are provided for vibrating the incising points or needles, while the same are being rotated; thus producing wavy lines of incision. This means is employed with or as a part of a head 150 which is substituted for the head 20 of any or all of the engraving devices, each of said heads having provision for securing it removably to the rod 23 so as to permit interchangeability thereof.

The head 150 has a lateral extension 151 provided with an arm or lever 152 which is pivoted between the ends to a post 153 which is fixed to the rod 23 whereby rotative movement of the rod is transmitted to the head. A relatively fixed part of the device, as for example the tube 125', is provided with a vibrator 154 which bears upon the arm or lever 152. This vibrator is here shown as a collar having its periphery 155 interrupted at various places to produce a design of a peculiar character, and it will be apparent that this portion of the vibrator may be of different formation conforming to the character of design which it is desired to produce. The lever is held against the vibrator and compelled to follow the lines of the design thereon, by means of a spring 156 here shown as arranged between the extension 151 and post 153.

The construction and operation of the machine will readily be understood from the foregoing and it will be noted that I have provided a machine which is characterized among other things by an entire absence of jar of any of the running parts in contact with each other and the article to be engraved; is mainly automatic in its operation but fully controllable by the attendant; contains full provision for producing a multiplicity of different designs with means for readily changing from one to another; is adapted to different sizes and types of articles; and in its operation produces smoothly cut lines in the etching ground so that the etched design is sharply defined. It also has provision for taking up wear in the parts, by reason of the provision of a conical bearing surface whenever necessary. Thus, as shown in Fig. 4, one of such surfaces, 160, is mounted upon the rod 23 to engage the cylinder 125', and, as shown in Fig. 7, another of such bearing surfaces 170 is secured to each shaft of the train of gears to engage the bearings 180 for said shafts.

Having now described the invention what I believe to be new and desire to secure by Letters Patent, is:—

1. A machine of the character described, comprising an incising point or needle, a carrier therefor, mounted to reciprocate to and from the work, and means for pneumatically controlling the reciprocation of said carrier, and maintaining said incising point or needle in engagement with the work, substantially as described.

2. A machine of the character described, comprising an incising point or needle, a carrier therefor, mounted to reciprocate to and from the work, a spring for moving the carrier in a direction away from the work, and means for pneumatically moving the same in the opposite direction, and maintaining the incising point or needle in engagement with the work, substantially as described.

3. A machine of the character described, comprising an incising point or needle, a carrier therefor, mounted to reciprocate to and from the work, a spring for moving the carrier in a direction away from the work, a piston having connection with the carrier, and means whereby said piston is subjected to a vacuum, adapted to move it and the said carrier in opposition to said spring, and to maintain the said incising point or needle in engagement with the work, substantially as described.

4. A machine of the character described, comprising an incising point or needle, a carrier therefor, mounted to reciprocate to and from the work, a spring for moving the carrier in a direction away from the work, a piston, a connecting means between the piston and the carrier, a cushioning means for the carrier, and means whereby said piston is subjected to a vacuum, adapted to move it and the carrier in opposition to the spring, and to maintain said incising point or needle in engagement with the work, substantially as described.

5. A machine of the character described, comprising an incising point or needle, a carrier therefor mounted to reciprocate to and from the work, and means for moving said carrier, comprising a piston having connection therewith, a cylinder containing the head of said piston, and means for producing a current of air in said cylinder, adapted to move said carrier toward the work, and to maintain the said incising point or needle in engagement therewith, substantially as described.

6. A machine of the character described, comprising an incising point or needle, a carrier therefor mounted to reciprocate to and from the work, and means for reciprocating said carrier, comprising a piston having connection therewith, a cylinder containing the head of said piston, means for producing a vacuum in the cylinder adapted to cause movement of said carrier in a direction toward the work, and to maintain the incising point or needle in engagement therewith, and means for moving the carrier in the opposite direction, when said vacuum is relieved, substantially as described.

7. In a machine of the character described, a support for the article to be engraved, an incising point or needle, a carrier therefor mounted to rotate to and from the article, and means for pneumatically holding the article upon its support, and controlling the reciprocation of the carrier, adapted to maintain the said incising point or needle in engagement with the article, substantially as described.

8. In a machine of the character described, an incising point or needle, a hollow support for the article to be engraved, a carrier for said incising point or needle, mounted to reciprocate to and from the article, a piston for moving the carrier in one direction, a cylinder in which the head of the piston is arranged, means for producing currents of air within the support and cylinder, having a regulator for controlling such current, adapted to maintain the said incising point or needle in engagement with the article, and means for moving the carrier in a direction opposite to that in which it is moved, by the said piston, substantially as described.

9. In a machine of the character described, a hollow support for the article to be engraved, an incising point or needle, a reciprocatorily-mounted carrier therefor, a piston for moving the carrier in one direction, a cylinder in which the head of the piston is arranged, means for producing currents of air between the support and cylinder, having a common regulating means for such current, adapted to introduce the same successively into operation and means for moving the carrier in the direction opposite to that in which it is moved by the piston.

10. In a machine of the character described, a hollow support for the article to be engraved, an incising point or needle, a carrier therefor, mounted to reciprocate to and from the article, means for moving the carrier in a direction away from the article, a cylinder, a piston mounted in said cylinder and having its rod connected with the carrier, a vacuum pump, and connections between the vacuum pump and the support and cylinder, adapted to move the latter in a direction toward the article, and to maintain the said incising point or needle in engagement with the article, substantially as described.

11. In a machine of the character described, a hollow support for the article to be engraved, an incising point or needle, a reciprocatorily-mounted carrier therefor, means for moving the carrier in one direction, a cylinder, a piston mounted in said cylinder and having its rod connected with the carrier, a vacuum pump, and connections between the vacuum pump and the support and cylinder, said connections provided with a regulator adapted successively to open the passages to the support and cylinder.

12. A machine of the character described, comprising an incising point or needle, mounted to reciprocate to and from the work, and means for pneumatically controlling the reciprocation of said incising point or needle, and maintaining the same in engagement with the work, substantially as described.

13. In a machine of the character described, a carrier for the incising point or needle and means for rotating the same, comprising a shaft arranged at an angle therewith, intermeshing gears on the contiguous ends of the shaft and carrier and means for driving the shaft, in combination with an oscillatory support for the carrier, a second element which encircles the shaft and a bent arm connecting these elements with each other, an arm extending from the second element and a like arm connecting the latter arm with an element of the means for driving the shaft.

14. In a machine of the character described, a carrier for the incising point or needle and means for rotating the same, comprising a shaft arranged at an angle therewith, intermeshing gears on the contiguous ends of the shaft and carrier and means for driving the shaft, in combination with an oscillatory support for the carrier, having an element which encircles the carrier, a second element which encircles the shaft and a bent arm connecting these elements with each other, an arm extending from the second element, an adjustable device carried by an element of the means for driving the shaft, and a link connecting the last-mentioned arm with said device.

15. In a machine of the character described, an engraving device, a hollow support for the article to be operated on, said support comprising an adjustable table, a tube depending from the table, means for holding the tube and table in adjusted position, a vacuum-producing means, and a connection between the vacuum-producing means and tube, said connection having an element which extends into the tube and is slidably engaged by the latter.

16. In a machine of the class described, a rotative support and an engraving device, combined with means for reciprocating the engraving device, having a controlling element which is automatically operated at a predetermined time in the rotation of the support to cause the engraving device to be retracted from the latter.

17. In a machine of the class described, a support for the article being engraved and an engraving device, combined with means for operating the engraving device, having a pneumatically-operated element for moving the same in one direction, and means for automatically controlling the air to permit of movement of the engraving device to clear a projection from the surface being engraved.

18. In a machine of the character described, a reciprocatory engraving device, mechanism for pneumatically controlling the reciprocation thereof, a rotative support for the article to be engraved and means movable with said support for controlling the pneumatic mechanism to cause movement of the engraving device at a predetermined time in the rotation of the support.

19. In a machine of the character described, a reciprocatory carrier for the incising point or needle, a piston having connection therewith, a cylinder containing the head of said piston, means for producing a vacuum in the cylinder, a valvular mechanism through which the cylinder may have communication with the atmosphere, and means for automatically operating the valvular mechanism to relieve the vacuum in said cylinder at a predetermined time in the operation of said incising point or needle.

20. In a machine of the character described, a reciprocatory carrier for the incising point or needle, a piston having connection therewith, a cylinder containing the head of said piston, means for producing a vacuum in the cylinder, a valvular mechanism through which the cylinder may have communication with the atmosphere a rotative support for the article being engraved and means movable with said support for automatically operating said valvular mechanism.

21. In a machine of the character described, a support for the article to be engraved, a carrier for the incising point or needle, means for producing relative rotative movement between the support and carrier mechanism for reciprocating the carrier, including means whereby the reciprocation is controlled pneumatically and devices for controlling the latter means at predetermined times in such relative rotative movement adapted to cause the incising point or needle to clear projections from the article being engraved.

22. In a machine of the character described, a support for the article to be engraved, a plurality of carriers for the incising points or needles arranged radially around the support, means for producing relative rotative movement between the support and carriers, mechanism for reciprocating the carriers, including means whereby their reciprocations are controlled pneumatically and devices for controlling the latter means at predetermined times in such relative rotative movement adapted to cause the incising points or needles successively to be retracted from the article being engraved.

23. In a machine of the character described, a support for the article to be engraved, a plurality of carriers for the incising points of needles arranged radially around the support, means for producing relative rotative movement between the support and carriers, mechanism for reciprocating the carriers, including pistons having connection therewith, cylinders containing the heads of said pistons, means for producing vacuum in said cylinders, a valvular mechanism through which the cylinders may have communication with the atmosphere and means for operating said valvular mechanism to relieve the vacuum in said cylinders successively at predetermined times in the relative rotative movement between the support and carriers.

24. In a machine of the character described, a rotative support for the article to be engraved, a plurality of carriers for the incising points or needles, arranged radially around the support, mechanism for reciprocating the carriers, including pistons having connection with said carriers, cylinders containing the heads of said pistons and each provided with a valvular means through which it may have communication with the atmosphere, means for producing vacuum in said cylinders and means carried by the rotative support and arranged to operate said valvular means at predetermined times in the rotative movement of said support.

25. In a machine of the character described, a plurality of engraving devices each reciprocatorily mounted and provided with means for pneumatically controlling its reciprocation, and means whereby the pneumatic devices are independently controllable.

26. In a machine of the character described, a plurality of engraving devices each reciprocatorily mounted and provided with means for pneumatically controlling its reciprocation the latter means including an air pump, cylinder for each engraving device, a piston in each cylinder, a connection between each piston and engraving device, a regulator in a passage leading from the pump, a connection between the regulator and one or more of the cylinders, and connections between the regulator and one or more others of the cylinders, the latter connections each provided with a valve for controlling the flow of air therethrough.

27. In a machine of the character described, a head adapted to carry the incising point or needle, a rotative rod, a lever extending from the head, means carried by the rod and to which the lever is pivoted, a relatively stationary vibrator and a spring for holding the lever against the surface of the vibrator.

28. In a machine of the character described, the combination of a support for the article to be operated on, an engraving device, means for holding the article upon said support and actuating said engraving device thereagainst, and means for controlling said last named means, adapted to secure the article previous to the actuation of said engraving device upon the commencement of the engraving operation, and to release said engraving device previous to the release of the article upon the completion of the engraving operation, substantially as described.

29. In a machine of the character described, the combination of a support for the article to be operated on, an engraving device, a vacuum chamber, connections between said chamber and said support and engraving device, and a valve having an operating handle, and to successively control the completion of the vacuum through said support and said engraving device, substantially as described.

30. In a machine of the character described, the combination of a support for the article to be operated on, an engraving device, a vacuum producing means, connections between said vacuum producing means and said support and engraving device, and a manually operable valvular means arranged within said connections, having communication with the atmosphere, and provided with elements to first bring said article, and subsequently, said engraving device into communication with said vacuum means at the commencement of the operations, and to bring said engraving device and subsequently, said article support into communication with the atmosphere upon the completion of an operation, substantially as described.

In testimony whereof I affix my signature in presence of two witnesses.

ALBERT B. KNIGHT.

Witnesses:
H. J. PRICE,
F. H. JACKSON.